United States Patent [19]

Nakagawa et al.

[11] Patent Number: 5,216,429
[45] Date of Patent: Jun. 1, 1993

[54] POSITION MEASURING SYSTEM USING PSEUDO-NOISE SIGNAL TRANSMISSION AND RECEPTION

[75] Inventors: Yoshikatsu Nakagawa, Yamato; Takaaki Hasegawa, Kawaguchi, both of Japan

[73] Assignee: Ricoh Company, Ltd., Tokyo, Japan

[21] Appl. No.: 870,469

[22] Filed: Apr. 17, 1992

[30] Foreign Application Priority Data

| Apr. 17, 1991 | [JP] | Japan | 3-113927 |
| Jun. 17, 1991 | [JP] | Japan | 3-182972 |
| Jan. 8, 1992 | [JP] | Japan | 4-020568 |

[51] Int. Cl.$^5$ .............................................. G01S 3/02
[52] U.S. Cl. .................... 342/450; 342/463; 342/465
[58] Field of Search ................. 342/450, 463, 465

[56] References Cited

U.S. PATENT DOCUMENTS

| 3,705,404 | 12/1972 | Chisholm | 342/450 |
| 3,793,635 | 2/1974 | Potter | 342/450 |
| 4,698,781 | 10/1987 | Cockerell, Jr. | 342/463 X |
| 4,703,444 | 10/1987 | Storms, Jr. et al. | 342/463 X |
| 4,799,062 | 1/1989 | Sanderford, Jr. et al. | 342/450 |
| 5,056,106 | 10/1991 | Wang et al. | 342/450 X |

FOREIGN PATENT DOCUMENTS 3-205579 9/1991 Japan.

*Primary Examiner*—Mark Hellner
*Attorney, Agent, or Firm*—Oblon, Spivak, McClelland, Maier & Neustadt

[57] ABSTRACT

A system for measuring a position of an object moving in a limited area includes a transmitter provided on the moving object for periodically transmitting pseudo-noise signals at time intervals in accordance with an intrinsic period assigned to the object, and a plurality of stations located at predetermined coordinates, each of the stations including a receiving part for receiving the signals so that pulse signals whose period is matched with the intrinsic period are output, and a detecting part for detecting correlative pulses from the pulse signals. The system further includes a delay detecting part for detecting a time difference between reception of a first correlative signal by one of the stations and reception of each of the subsequent correlative pulses by the other stations, and a control part for calculating coordinates of the position of the moving object based on the time differences and based on the given coordinates of the stations, so that the calculated coordinates of the position are output.

10 Claims, 14 Drawing Sheets

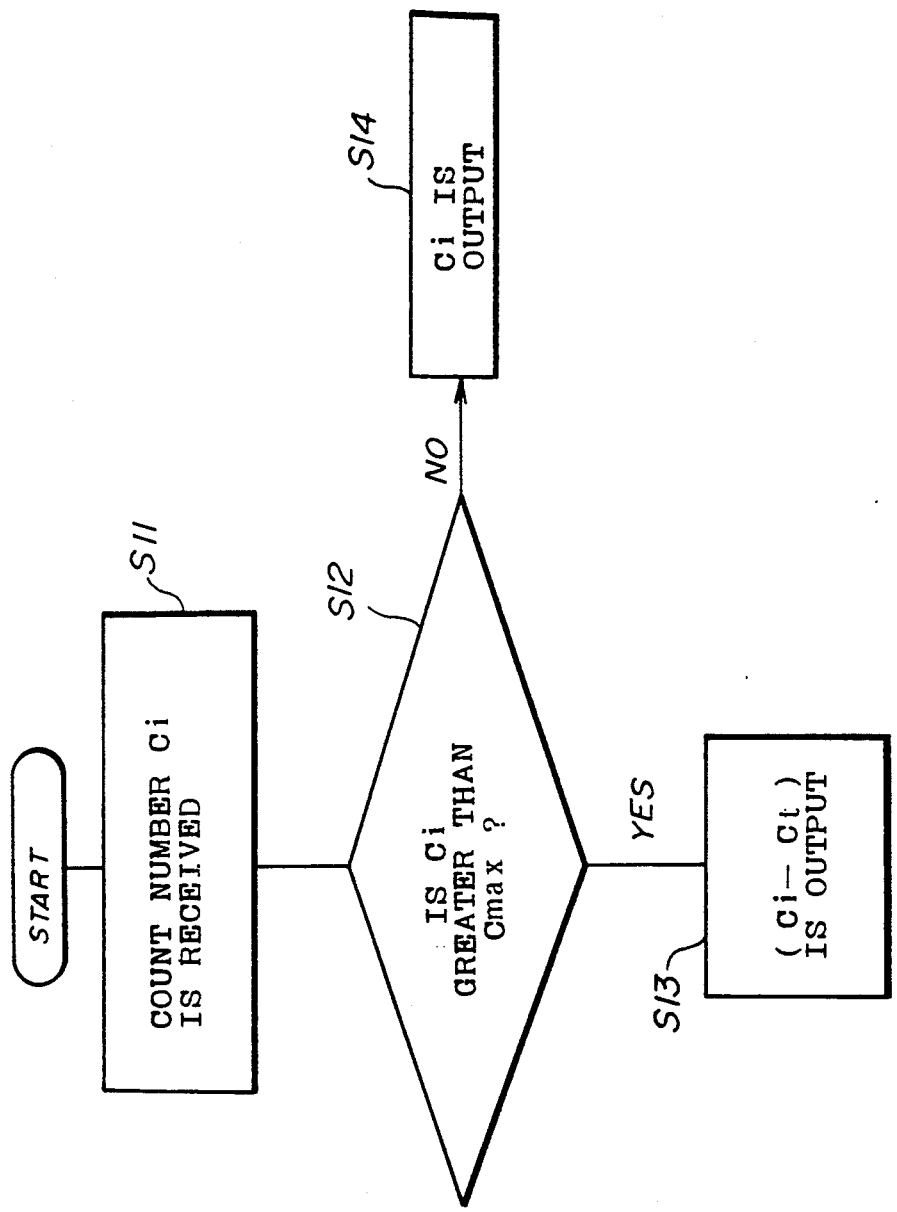

POSITION MEASURING SYSTEM USING PSEUDO-NOISE SIGNAL TRANSMISSION AND RECEPTION

BACKGROUND OF THE INVENTION

The present invention generally relates to a position measuring system, and more particularly to a system for measuring a position of an object moving in a limited area, the position measurement being done by detecting pseudo-noise signals from a transmitter carried on the object by means of a plurality of stations provided in the area, so that coordinates of a detected position of the object are calculated and output. This system is applicable to local-area radiocommunication, factory automation, home automation or the like.

In the prior art, there exists a position measuring system for measuring a position of an object moving in a limited area, the area being located indoors in particular. In this system, a plurality of stations is provided in the area for receiving pseudo-noise (PN) signals from a transmitter carried o the object. The coordinates of a position of the object are calculated by a computer from the received signals. Such a system is disclosed, for example, in Japanese Laid-Open Patent Application No. 3-205579. In the system, the object carries a transmitter for transmitting the pseudo-noise (PN) signals to the stations, and it is necessary that the object has a clock coupled to the transmitter for sending sync signals as a time base for controlling the timing of transmission of the PN signals by the transmitter. The plurality of stations is connected to the computer via connecting cables and a second clock is coupled to the computer, so that correlative pulses are sent from the stations to the computer and the coordinates of the position of the object are calculated from the received correlative pulses in accordance with the time base established by the second clock. Also, it is required that each of the stations has a synchronizing circuit for controlling the timing of reception of the PN signals from the transmitter and the timing of sending of the correlative pulses to the computer. According to the conventional system, it is possible to carry out real-time tracking of the position of the object moving in the limited area. However, there is a problem in that the transmitter carried on the object requires a clock and in that each of the stations requires a synchronizing circuit. The structure of the system thus becomes complicated and the manufacturing cost is increased.

In the prior art, a modified position measuring system has been proposed for use in a case where it is not necessary to perform a continuous tracking of the position of the object when the object moves slowly in the area or the movement of the object is relatively small. The modified position measuring system has a simple structure and can periodically detect the position of the moving object in the area. In the modified system, a matched filter for generating correlative pulses in response to the received PN signals is used instead of the synchronizing circuit as described above. However, in the modified system, time durations between transmission of the PN signal by the transmitter and reception of the same by the stations are measured, and the coordinates of the position of the object are calculated by the computer from the measured time durations. Thus, it is also necessary that the measurement of the time duration and the calculations of the coordinates of the position are done according to the time base established by the second clock coupled to the computer. Moreover, there is a problem in that the measured time durations may have different variations between the stations due to the transmission delay of signals in each the connecting cable between the computer and the stations. Thus, the calculated coordinates of the position of the object may have significant errors.

SUMMARY OF THE INVENTION

Accordingly, it is a general object of the present invention to provide an improved position measuring system in which the above described problems are eliminated.

Another and more specific object of the present invention is to provide a position measuring system of a simple structure in which each of the stations no longer requires a synchronizing circuit. Still another object of the present invention is to provide a position measuring system which accurately measures a position of the object before the coordinates of the position of the object are calculated, by eliminating the problem of existence of errors due to transmission delays in the connecting cables between the computer and the stations. A further object of the present invention is to provide a position measuring system of a simple structure which no longer requires the clock coupled to the transmitter or the second clock coupled to the computer for achieving synchronization of signals exchanged between the transmitter and the receiver. The above mentioned objects of the present invention can be achieved by a position measuring system which includes a transmitter provided on a moving object for periodically transmitting pseudo-noise signals at time intervals in accordance with an intrinsic period assigned to the object, and a plurality of stations located at predetermined coordinates in the limited area, each of the stations including a receiving part for receiving the signals from the transmitter so that pulse signals whose period is matched with the intrinsic period of the received signals are supplied, and a detection part for detecting correlative pulses from the pulse signals supplied by the receiving part, the position measuring system further including a delay detecting part for detecting a time difference between reception of a first pulse signal of the correlative signals by one of the stations and reception of each of the remaining correlative pulses by each of the remaining stations in response to the correlative pulses supplied by the detection parts of the stations, and a control part for calculating coordinates of the position of the object based on the time differences supplied by the delay detecting part and based on the predetermined coordinates of each of the stations, so that the calculated coordinates of the position are output. According to the present invention, it is possible to accurately measure the position of the moving object in the limited area so that accurate coordinates of the detected position are output. It is not necessary for the present invention to use the clock connected to the computer for supplying sync signals as the time base in measuring the time durations for arrival of the PN signals as well as in calculating the coordinates of the detected position of the object. Also, the position measuring system of the present invention has a simple structure, that is, the system no longer requiring the clock coupled to the transmitter, the second clock coupled to the computer, or the synchronizing circuit in each of the stations.

BRIEF DESCRIPTION

FIG. 15 is a flow chart for explaining a correction process in which the outputs of counters are corrected in the delay detecting unit of FIG. 14.

DESCRIPTION OF THE PREFERRED EMBODIMENTS

Figure 1:
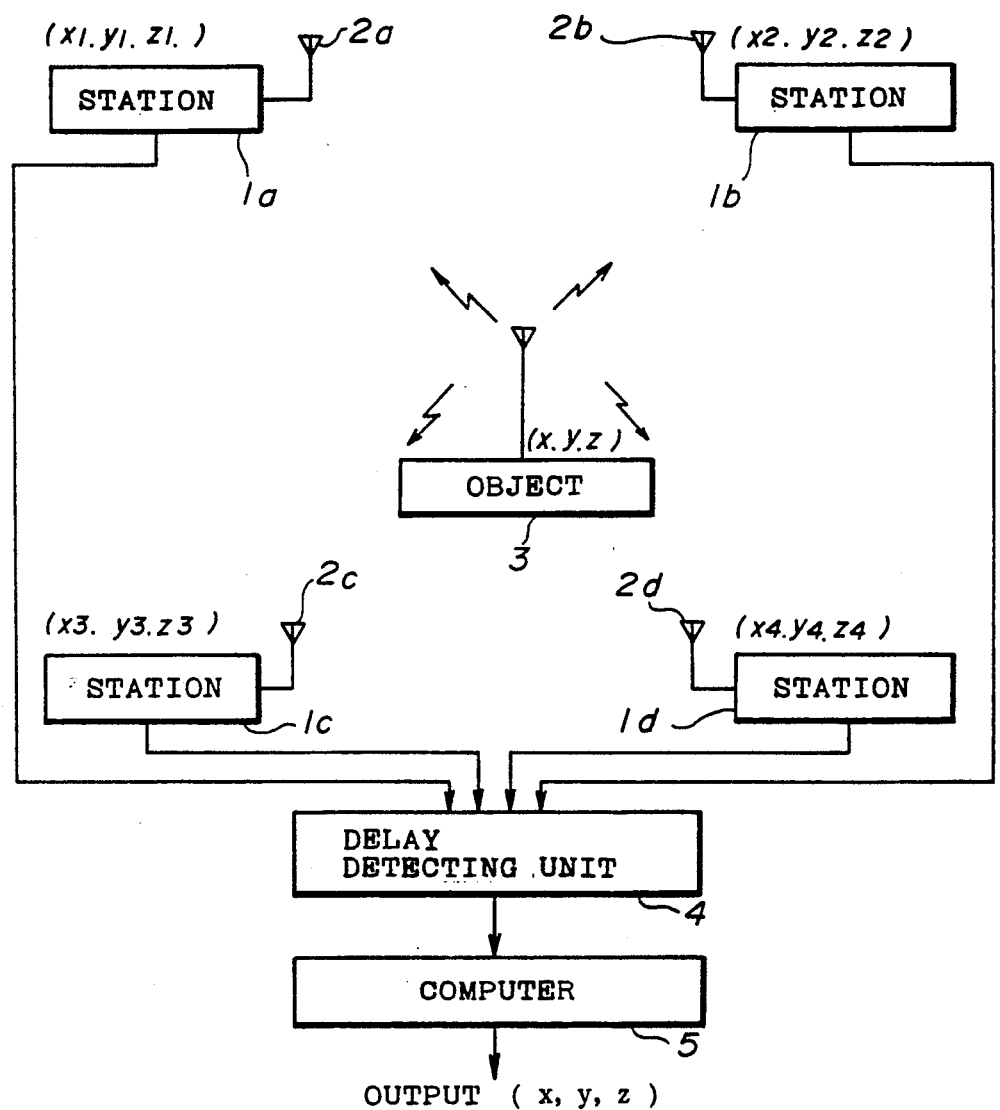
FIG. 1 is a diagram showing a position measuring system according to the present invention.

A description will now be given of a position measuring system according to the present invention, with reference to FIG. 1. This system detects a position of an object moving in a limited area, so that coordinates of a detected position of the moving object is output. In FIG. 1, this system includes a plurality of stations 1a through 1d having receiver units with antennas 2a through 2d, a transmitter 3 carried on a moving object whose position is to be measured, a delay detecting unit 4, and a computer 5.

The stations 1a to 1d are provided in the limited area. They are located indoors, for example, at corners of a ceiling of a room. Coordinates of the position of each antenna of the receivers of the stations 1a to 1d in the area are pre-known. The stations 1a to 1d are so arranged in the limited area that coordinates of the position of the transmitter 3 in the area can uniquely be determined by the received PN (pseudo-noise) signals from the transmitter and by the known coordinates of the positions of the receivers.

The transmitter 3 and the stations 1a through 1d are located within sight of each other, and carrier waves for sending the PN signals are propagated through a line-of-sight distance between them and the carrier waves are received by the antennas 2a to 2d of the stations 1a to 1d.

The carrier wave for transmitting PN (pseudo-noise) signals from the transmitter 3 may be any one of light, sound waves and radio waves. In this embodiment, radio waves are used as the carrier wave of the PN signals. When light or sound waves are used as the carrier of the PN signals, it is necessary for the position measuring system to additionally include a suitable converter which converts the received PN signals into electric signals.

In this position measuring system, the transmitter 3 carried on the moving object continuously or intermittently transmits PN (pseudo-noise) signals, and the stations 1a through 1d respectively receive the PN signals from the transmitter 3. A set of correlative pulses $S_i(t)$ ($i=1$ to 4) is detected in the stations 1a through 1d, and the correlative pulses $S_i(t)$ are supplied from the stations 1a through 1d to the delay detecting unit 4.

A set of pulses indicative of time differences $t_i$ ($i=1$ to 4) between reception of the first correlative pulse by on of the stations and reception of the subsequent correlation pulse by each of the other stations is detected by the delay detecting unit 4. The results of the detection are supplied by the delay detecting unit 4 to the computer 5. According to the present invention, the coordinates (x y, z) of the position of the moving object are calculated by the computer 5 from the received pulses indicative of the time differences $t_i$ and the known coordinates $(X_i, Y_i, Z_i)$ ($i=1$ to 4) of the positions of the antennas 2a through 2d of the stations 1a through 1d.

Figure 2:
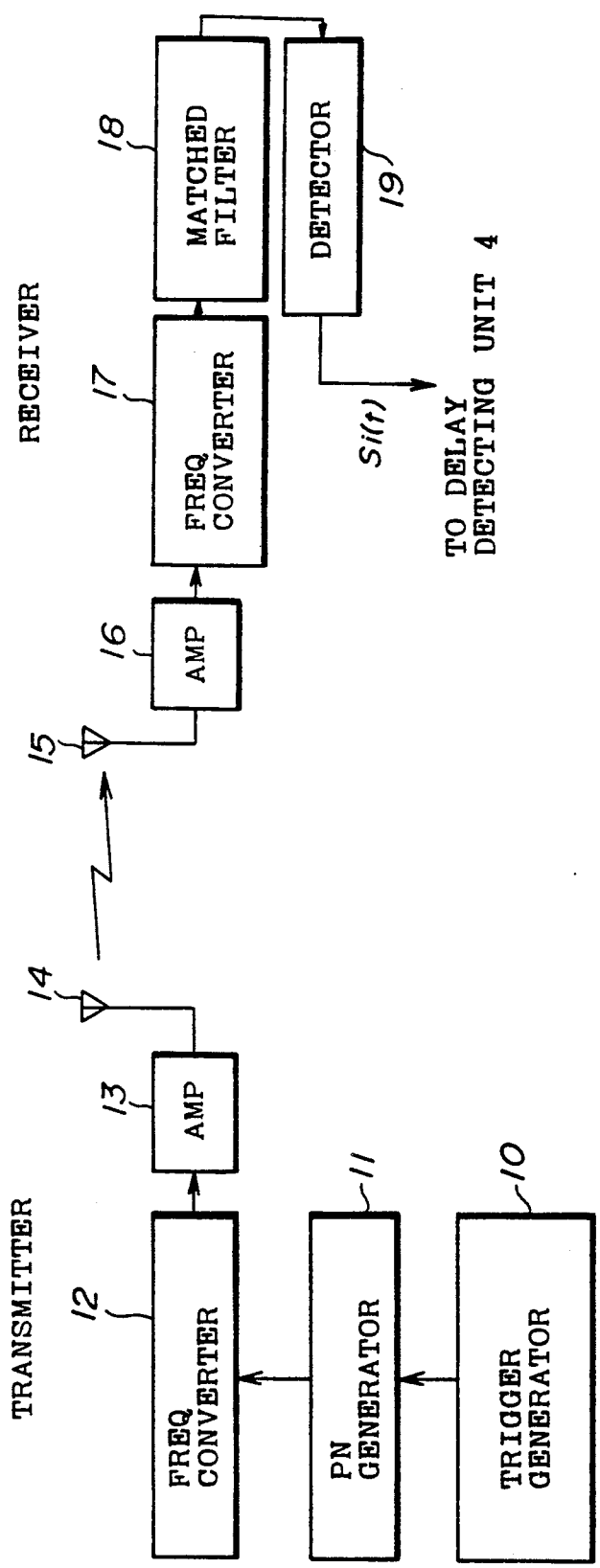
FIG. 2 is a block diagram showing a transmitter carried on a moving object and a receiver in each of a plurality of stations in the position measuring system of the present invention in a first embodiment.

FIG. 2 shows the construction of a receiver in each of the stations 1a through 1d and the construction of a transmitter 3 carried on the moving object in the first embodiment of the present invention. The transmitter 3 of this embodiment includes a trigger generator 10 periodically generating a trigger signal, a PN generator 11 for generating PN (pseudo-noise) signals when the trigger signal is received, a frequency converter 12, an amplifier 13 and an antenna 14. The receiver unit in each of the stations includes an antenna 15, an amplifier 16, a frequency converter 17, a matched filter 18, and a detector 19.

The moving object carries the transmitter 3 having the PN generator 11 which generates PN signals intrinsic to the moving object. The frequency converter 12 converts the P signals received from the PN generator 11 into signals with frequencies falling in a radio frequency (RF) band (e.g. ranging between 800 MHz and 1 GHz). Such PN signals are sent by the transmitter 3 to each of the receivers of the stations 1a through 1d via the antennas 14 and 15. The timing of generating the P signals is controlled by the trigger generator 10, and the PN signals are periodically transmitted at given intervals of time period "T" by setting the trigger generator 10.

Each of the receivers of the stations 1a through 1d receives the PN signals with frequencies in the RF band from the transmitter 3 on the moving object, and the frequency converter 17 converts the received PN signals into PN signals having frequencies falling in an intermediate frequency (IF) band. The PN signals having the IF band frequencies are passed through the matched filter 18. The signals passed through the matched filter 18 is set in conformity with an intrinsic period T assigned to the moving object. After the signals are passed through the detector 19, self-correlative peak pulses are output by each of the receivers of the stations 1a through 1d. The functions of the matched filter 18 can be achieved by using conventional SAW devices or CCD devices. It is a matter of course that a different device suitable for outputting the self-correlative peak pulses can be used instead.

Figure 3:
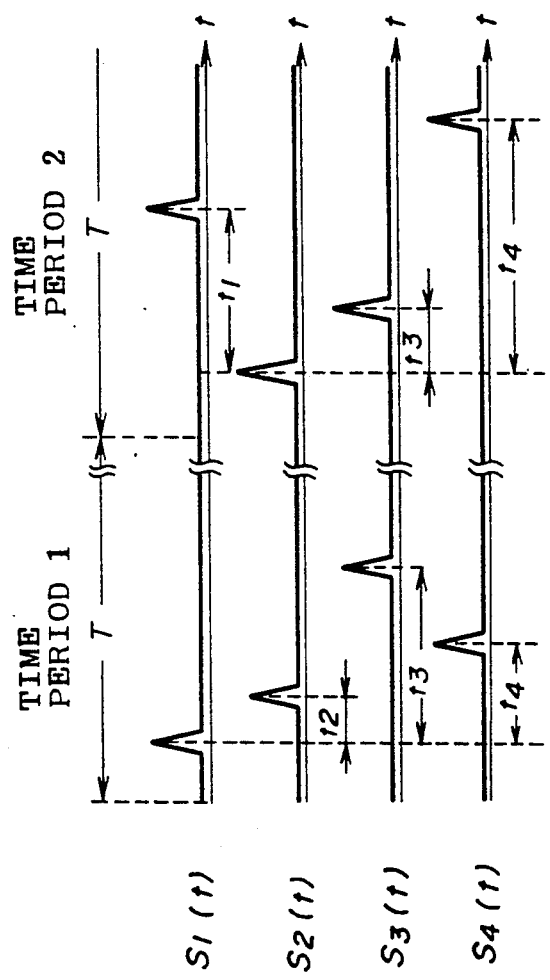
FIG. 3 is a time chart showing pulses which are received by a delay detecting unit from the stations.

FIG. 3 shows a set of correlative pulses which are output by the stations 1a through 1d and received by the delay detecting unit 4. The timing of generating the trigger signals by the trigger generator 10 and the time periods between which the PN signals are generated by the PN generator 11 may be arbitrarily selected. However, as multipass phasing may occur due to the measuring environment in which the position measuring is performed, it is necessary that the time periods between which the PN pulses are generated are selected to be greater than a decay time for the multipass phasing to be attenuated to a negligible level.

In FIG. 3, during Time Period 1 of "T", the PN pulse from the transmitter 3 on the moving object is first received and detected by the station 1a, and the PN pulses are subsequently received and detected by the stations 1b, 1d and 1c, in this order. If time differences t2, t3 and t4 between reception of the first PN pulse by the station 1a and reception of the subsequent PN pulses by the remaining stations 1b, 1c and 1d are detected, the relationship between the coordinates (x, y, z) of the position of the moving object and the known coordinates (Xi, Yi, Zi) of each antenna of the stations 1a through 1d is represented by the following equations:

$$[(X2 - x)^2 + (Y2 - y)^2 + (Z2 - z)^2]^{(\frac{1}{2})} - \qquad (1)$$
$$[(X1 - x)^2 + (Y1 - y)^2 + (Z1 - z)^2]^{(\frac{1}{2})} = c\,t2,$$
$$[(X3 - x)^2 + (Y3 - y)^2 + (Z3 - z)^2]^{(\frac{1}{2})} -$$
$$[(X1 - x)^2 + (Y1 - y)^2 + (Z1 - z)^2]^{(\frac{1}{2})} = c\,t3,$$
$$[(X4 - x)^2 + (Y4 - y)^2 + (Z4 - z)^2]^{(\frac{1}{2})} -$$
$$[(X1 - x)^2 + (Y1 - y)^2 + (Z1 - z)^2]^{(\frac{1}{2})} = c\,t4$$

where c is the speed of carrier propagation, or the speed of light in this case. By solving the above equations with respect to the variables (x, y, z), the coordinates of the position of the object are calculated by the computer.

After the moving object is moved in the area, during Time Period 2 of T, the PN pulse from the transmitter 3 is first received and detected by the station 1b, and the PN pulses are subsequently received and detected by the stations 1c, 1a and 1d, in this order as shown in FIG. 3. If time differences t1, t3 and t4 between receiving first the PN pulse by the station 1b and subsequently receiving the PN pulses by the remaining stations 1a, 1c and 1d are detected, the relationship between the coordinates (x, y, z) of the position of the moving object after it is moved in the area and the known coordinates (Xi, Yi, Zi) of each antenna of the stations 1a through 1d is represented by the following equations:

$$[(X1 - x)^2 + (Y1 - y)^2 + (Z1 - z)^2]^{(\frac{1}{2})} - \qquad (2)$$
$$[(X2 - x)^2 + (Y2 - y)^2 + (Z2 - z)^2]^{(\frac{1}{2})} = c\,t1$$
$$[(X3 - x)^2 + (Y3 - y)^2 + (Z3 - z)^2]^{(\frac{1}{2})} -$$
$$[(X2 - x)^2 + (Y2 - y)^2 + (Z2 - z)^2]^{(\frac{1}{2})} = c\,t2$$
$$[(X4 - x)^2 + (Y4 - y)^2 + (Z4 - z)^2]^{(\frac{1}{2})} -$$
$$[(X3 - x)^2 + (Y3 - y)^2 + (Z3 - z)^2]^{(\frac{1}{2})} = c\,t4$$

By solving the equations (2) mentioned above with respect to the variables (x, y, z), the coordinates of the position of the object after the object has moved are calculated by the computer.

Figure 4:
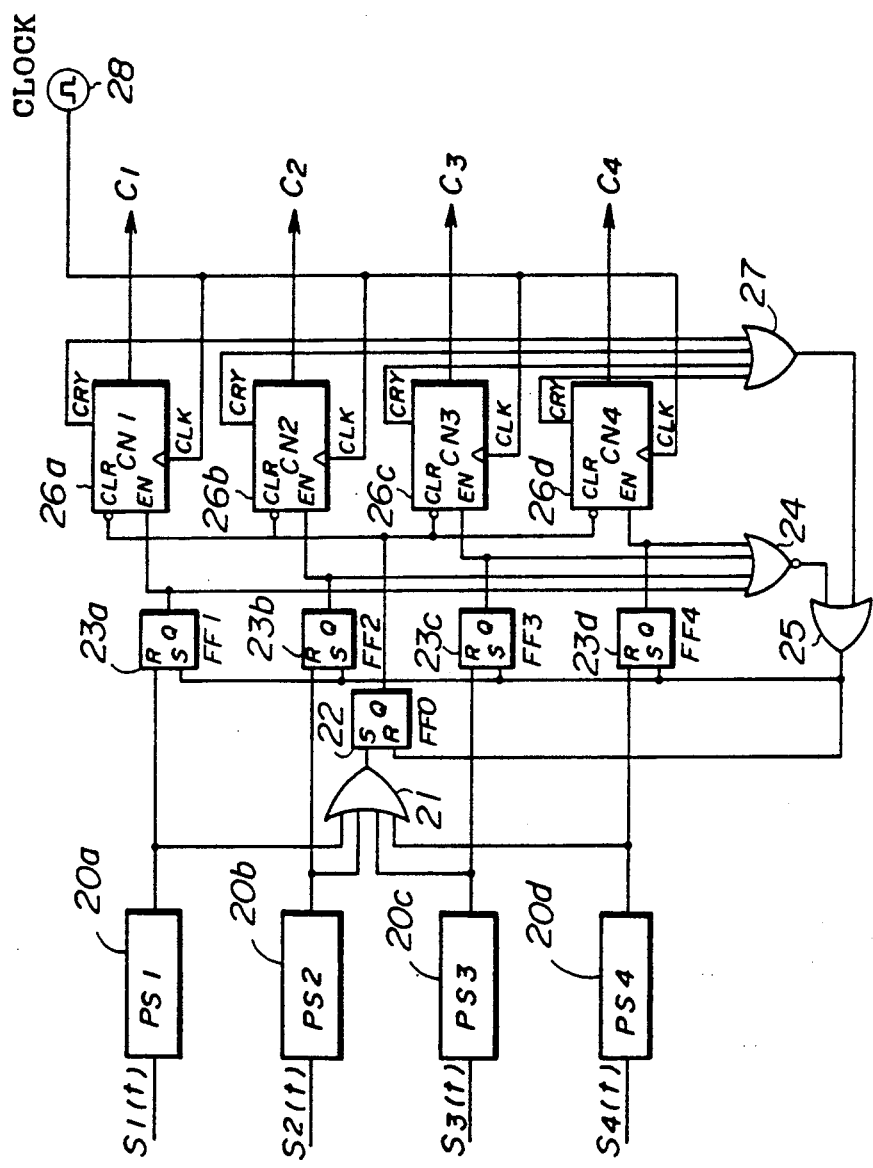
FIG. 4 is a circuit diagram showing the construction of the delay detecting unit.

FIG. 4 shows the construction of the delay detecting unit 4 in which the time differences t1 through t4 are determined from the correlative pulses S1(t) through S4(t) received from the stations 1a through 1d. In FIG. 4, reference numerals 20a to 20d denote pulse shapers PS1 to PS4, reference numerals 21, 25, 27 denote OR circuits, and a reference numeral 22 denotes a flip-flop device FF0. Also, reference numerals 23a to 23d denote flip-flop devices FF1 to FF4, a reference numeral 24 denotes a NOR circuit, reference numerals 26a to 26d denote counters CN1 to CN4, and a reference numeral 28 denotes a clock pulse generator.

The waveform of each of the correlative pulses Si(t) from the stations is shaped by each of the pulse shapers PS1 through PS4. The flip-flop device FF0 is set by the first incoming pulse passing through the OR circuit 21 among the pulses S1(t) through S4(t) from the stations 1a through 1d. When the flip-flop device FF0 is set, a clear signal is output to a CLR port of each of the counters CN1 through CN4 so that a counting of clock pulses sent from the clock generator 28 in the counters CN1 to CN4 is started. Each time one of the correlative pulses S1(t) through S4(t) is received by one of the flip-flop devices FF1 through FF4, that particular flip-flop device is reset to zero and an "enable" signal to the corresponding counter is set in low state so that the counting of clock pulses is stopped. In this manner, the counts C1 through C4 of clock pulses are supplied by the delay detecting unit 4 to the computer 5. After all the correlative pulses are received by the flip-flop devices FF1 through FF4, the flip-flop device FF0 is reset and all the counters CN1 through CN4 are reset to zero so that the delay detecting unit 4 is placed in ready condition for a next position measuring attempt. As a multipass phasing may occur due to the environmental condition, there is a problem in that all the stations do not receive the PN signals with a sufficiently high detection level from the transmitter on the moving object. In order to avoid this problem, a carry signal (CRY) indicative of a given delay time is output by a suitable counter, and the flip-flop FF0 is reset in response to the carry signal.

Because a counter of the delay detecting unit that has first received a correlative pulse from one of the stations is not activated so a counting of clock pulses is not started, a count of the clock pulses output by that particular counter is actually equal to zero. The time differences ti are calculated by the computer 5 from the counts Ci received from the counters CNi (i=1 to 4). Thus, the counter having first received the correlative pulse can be detected by checking which counter outputs the count zero to the delay detecting unit. For example, during Time Period 1 shown in FIG. 3, the pulse S1(t) from the station 1a is first received by the delay detecting unit 4. In this case, the count C1 output by the counter CN1 is equal to zero. The time differences t2 to t4 are calculated by the computer 5 from the counts C2 to C4 output by the counters CN2 to CN4. The accuracy of measurement of the position of the moving object depends on the clock pulse speed and the stability of the clock pulses. Accordingly, the coordinates (x, y, z) of the position of the moving object are calculated by the computer 5, by means of the above mentioned equations, from the time differences ti and the known coordinates (Xi, Yi, Zi) (i=1 to 4) of the positions of the antennas 2a to 2d of the stations 1a to 1d, so that the calculated coordinates of the position are output by the position measuring system.

Figure 5:
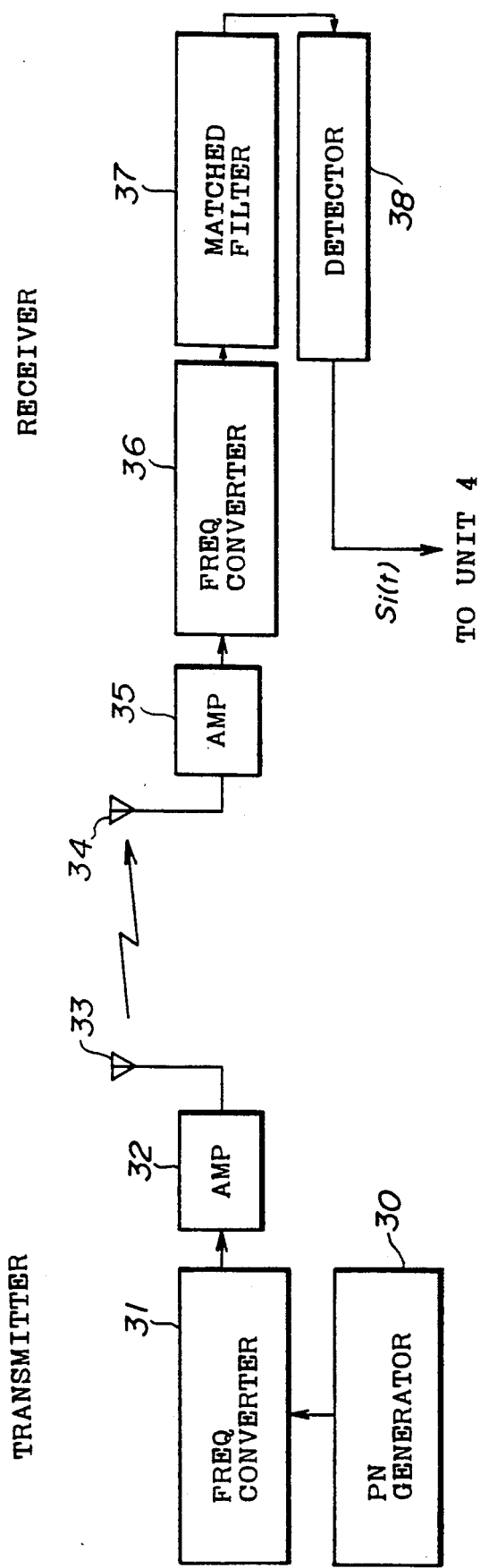
FIG. 5 is a block diagram showing a transmitter carried on the object and a receiver in each of the stations in the position measuring system of the invention in a second embodiment.

FIG. 5 shows the construction of a transmitter carried on the moving object and of a receiver in each of the stations in a second embodiment of the present invention. In FIG. 5, the transmitter of this embodiment includes a PN generator 31, a frequency converter 31, an amplifier 32 and a transmitting antenna 33, and the receiver includes a receiving antenna 34, a frequency converter 35, a matched filter 36 and a detector 37. In the first embodiment shown in FIG. 2, the PN signals are intermittently transmitted by this transmitter to each of the stations via the antennas 33 and 34. In the second embodiment shown in FIG. 5, no trigger generator is mounted in the transmitter and the PN signals are continuously transmitted by the transmitter. The other functions are the same as those of the position measuring system shown in FIGS. 1 and 2.

Figure 6:
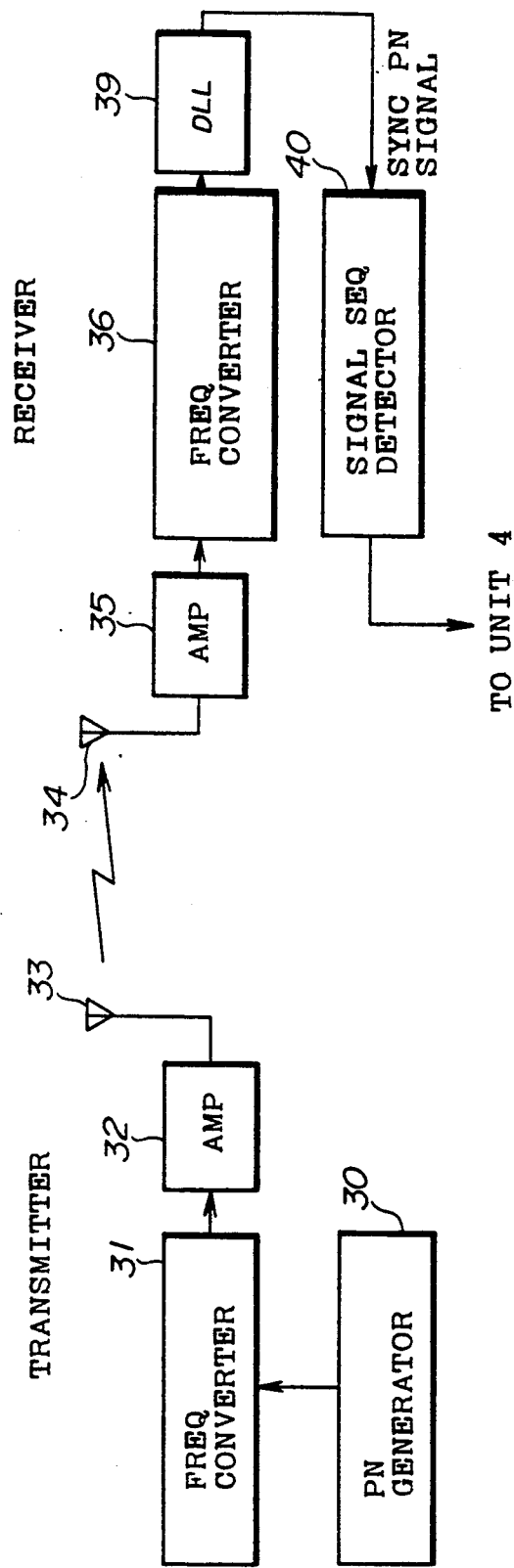
FIG. 6 is a block diagram showing a transmitter on the moving object and a receiver in each of the stations in the position measuring system of the invention in a third embodiment.

FIG. 6 shows a third embodiment of a transmitter carried on the moving object and of a receiver in each of the stations according to the present invention. In FIG. 6, the transmitter of this embodiment is the same as that of the second embodiment, but, unlike the second embodiment, the receiver in each of the stations includes a delay lock loop (DLL) 39 and a signal sequence detector 40, which are substituted for the matched filter 37 and the detector 48 shown in FIG. 5. The other parts of the third embodiment are the same as those corresponding parts of the second embodiment, and designated by the same reference numerals. In FIG. 6, the delay lock loop (DLL) 39 is a synchronizing circuit for performing a frequency tracking of the PN signals received from the transmitter on the moving object. The signal sequence detector 40 detects a prescribed sequence of the PN signals from those supplied by the DLL 39, and outputs a reception timing signal to the delay detecting unit 4 each time the prescribed sequence of the PN signals is detected.

Figure 7:
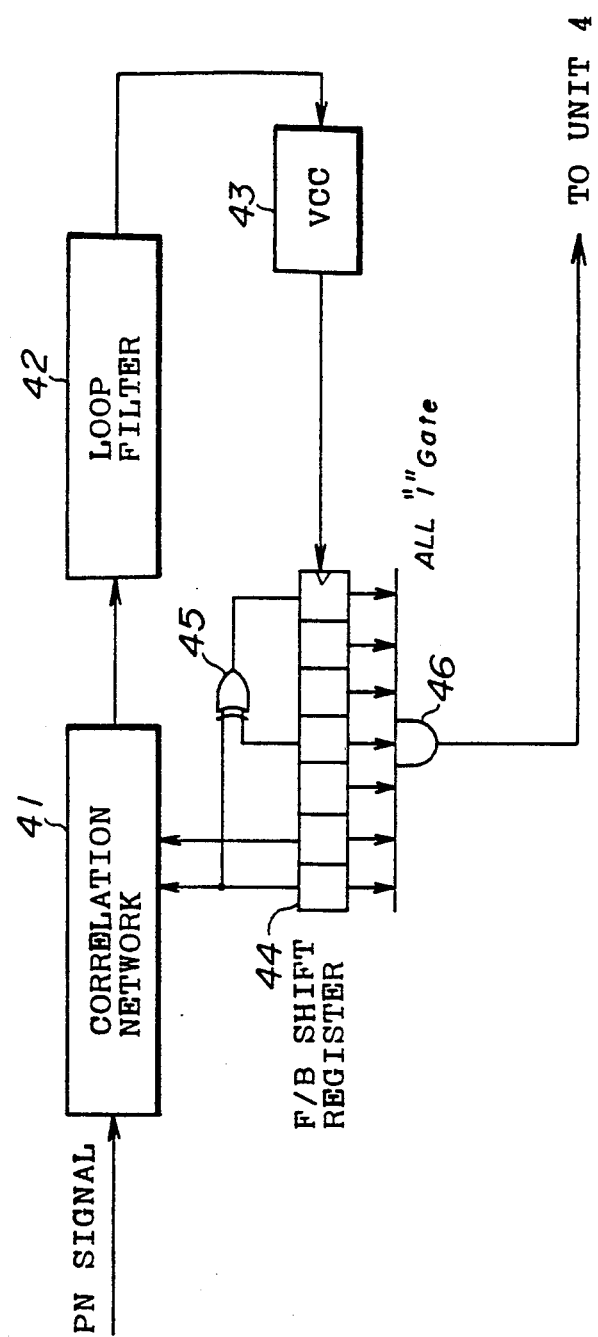
FIG. 7 is a circuit diagram showing a delay lock loop and a signal sequence detector both provided in the receiver shown in FIG. 6.

FIG. 7 shows a detailed structure of a delay lock loop and a signal sequence detector which are provided in the receiver shown in FIG. 6. In FIG. 7, the receiver includes a correlation network 41, a loop filter 42, a voltage control clock (VCC) 43, a seven-bit feedback shift register 44, an Exclusive-OR circuit 45 and an AND circuit 46. The delay lock loop of this receiver, formed from the correlation network 41, the loop filter 42, the VCC 43 and the Exclusive-OR circuit 45, performs frequency tracking of the received PN signals. The seven-bit feedback shift register 44 generates reference P signals in response to the signals supplied by the VCC 43. The reference PN signal supplied from each stage of the register 44 is input to the AND circuit 46. As there are various combinations of the reference PN signals which are supplied by the register 44 to the AND circuit 46, it is only one combination that a signal sequence "1111111" appears on the AND circuit 46. Thus, only when a signal sequence "1111111" from the register 44 is input to the AND circuit 46, the signal sequence detector outputs a reception timing signal to the delay detecting unit 4. The time differences ti (i=1 to 4) between the reception of the first incoming PN signal and the reception of each of the PN signals by the stations are measured by the delay detecting unit 4 by mean of this reception timing signal. Similarly to the first and second embodiments, the coordinates (x, y, z) of the position of the moving object are calculated by the computer 5 by means of the above mentioned equations, from the time differences ti and the known coordinates (Xi, Yi, Zi) (i=1 to 4) of the positions of the antennas 2a to 2d of the stations 1a to 1d, so that the calculated coordinates of the position of the moving object are output.

As described above, the position measuring system according to the present invention has a simple structure and no clock coupled to the transmitter on the moving object and no second clock coupled to the computer are required. According to the present invention, it is possible to periodically detect a position of the moving object in the limited area by means of this simple system, and the measurement errors in the measured time durations due to the transmission delays in the connecting cables can be reduced remarkably so that an accurate position of the moving object can be detected. Thus, the present invention can also be applied to a position measuring system using a sound wave as the carrier wave of the PN signals.

In the above described embodiments, a case in which a position of only one moving object in the limited area is detected and the coordinates of such a detected position are calculated and output is described. However, according to the present invention, it is also possible that positions of plural moving objects are detected and the coordinates of each of the detected positions are calculated and output, if plural transmitters are carried on the objects for transmitting different PN signals in different series of periods intrinsic to and assigned to the objects, and plural matched filters or delay lock loops corresponding to the PN signals are provided in each of the stations.

Next, a description will be given of a practical case in which the passage of the carrier of the PN signals from the transmitter to the stations is hindered due to an obstacle or the like existing between the moving object and the stations in the limited area. In such a case, the first incoming PN signal, which would reach one of the stations if no obstacle existed, is missing or discarded, and a position of the moving object is erroneously detected by regarding a PN signal subsequently incoming to the stations as the first one, thus the calculated coordinates of the position have significantly great errors. In order to eliminate this problem, the present invention provides an improved position measuring system having a suitable PN signal transmitter on a moving object and a suitable PN signal receiver in each of the stations. The transmitter and the receiver in the improved system function effectively for eliminating the erroneous detection of the PN signals in the above case.

Figure 8:
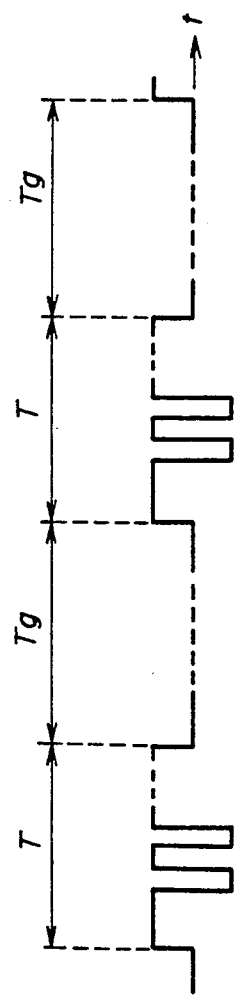
FIG. 8 is a time chart for explaining pulses which are transmitted by the transmitter to each of the stations.
Figure 9:
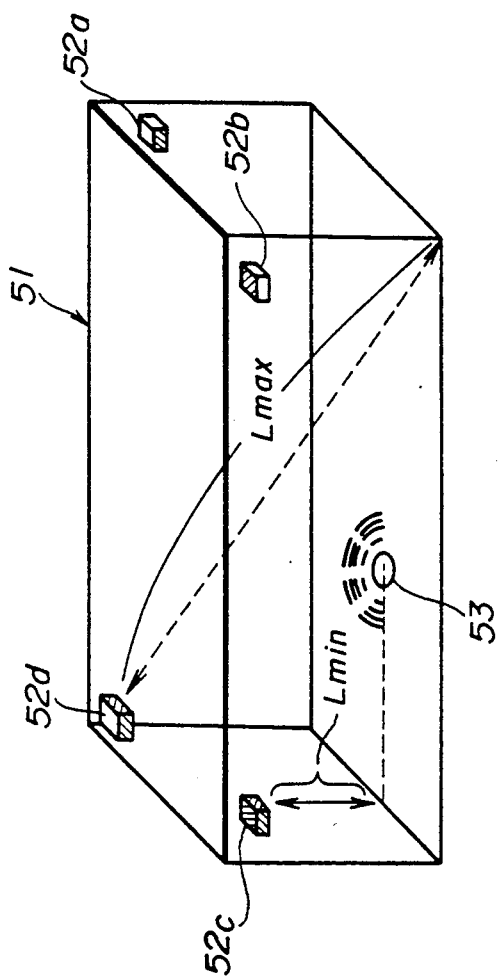
FIG. 9 is a perspective view showing a position measuring system including a plurality of stations and a moving object which are both provided in a limited area.

FIG. 8 shows pulses transmitted by the transmitter of the improved system according to the present invention. As shown in FIG. 8, a guard time Tg is interposed after PN signals are transmitted at given intervals of time period T1, that is, the PN signals are periodically transmitted at given time intervals of the period T1 predetermined by adding the guard time Tg to the intrinsic time period T assigned to the moving object (T1=T+Tg). This guard time Tg is represented by:

$$Tg = (Lmax - Lmin)/c \qquad (3)$$

where c is the speed of carrier propagation, Lmax is a maximum distance between the moving object and the furthest station, and Lmin is a minimum distance between the moving object and the nearest station. Generally, the maximum distance Lmax and the minimum distance Lmin are varied depending on the environment in which the system is arranged. FIG. 9 shows a position measuring system arranged in a typical local area, the system including a plurality of stations 52a through 52d and a moving object 53 which are both provided in a limited area 51. In FIG. 9, the area 51 is represented by a rectangular parallelepiped, the moving object is moving on a base surface thereof, and the four stations are arranged as shown. In the case of this system, the maximum distance Lmax is set to the length of a diagonal line of the rectangular parallelepiped, and the minimum distance Lmin is set to a distance between the nearest station and the base surface on which the moving object is located.

The pulse train as shown in FIG. 8 is periodically transmitted at appropriate intervals of time period T1 (the guard time Tg interposed) by a transmitter in which the setting of the trigger generator 10 is adjusted in such a manner that the pulses are periodically transmitted at given intervals of the time period T1 (=T+Tg).

Figure 10:
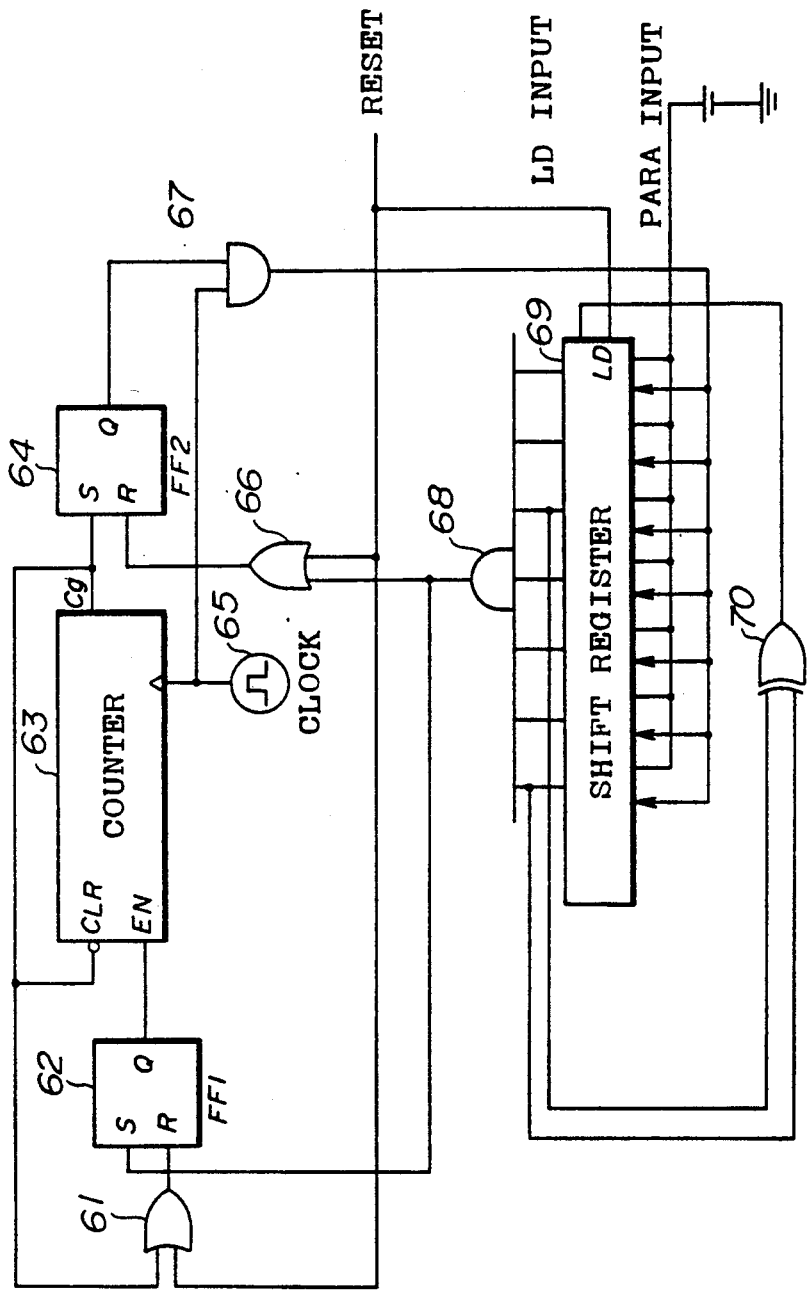
FIG. 10 is a circuit diagram showing a trigger generator of a transmitter in an improved position measuring system.

FIG. 10 shows a detailed structure of a trigger generator in an improved position measuring system. In FIG. 10, this trigger generator includes an OR circuit 61, a flip-flop (FF1) 62, a counter 63, a flip-flop (FF2) 64, a clock pulse generator 65, an OR circuit 66, AND circuits 67 and 68, a seven-bit feedback shift register 69, and an Exclusive-OR circuit 70. Instantaneously when the flip-flops FF1 and FF2 are reset by a reset signal, a signal sequence indicating an initial value "111111" is loaded to the register 69. Since the output of the flip-flop FF2 is in low state when the reset signal is supplied, the signal sequence stored in the register 69 remains unchanged and the initial value "1111111" is maintained. Then, the output of the flip-flop FF1 is changed to high state so that a counting of clock pulses supplied by the clock pulse generator 65 is started by the counter 63. After a carry signal indicating a count number Cg corresponding to the guard time Tg appears in the counter 63, the output of the flip-flop FF2 is changed to high state, so that the transmitter starts transmitting PN signals after the guard time Tg has elapsed. After a set of PN signals is transmitted for one time period T, the signal sequence stored in the register 69 is returned to again the initial value "1111111". The output of the AND circuit is changed to high state, and the transmitter stops transmitting the PN signals, so that the measurement of the guard time Tg is again started by the counter 63 for a next cycle. In this manner, the pulses shown in FIG. 8 can periodically be transmitted by the transmitter at appropriate intervals of the time period T1 for which the guard time Tg is interposed.

It should be noted that the guard time Tg is greater than a maximum time duration of the time differences ti that can be detected by the delay detecting unit. When the pulses shown in FIG. 8 are periodically transmitted by the transmitter at the intervals of the time period T1, it is necessary that the guard time Tg is measured by the delay detecting unit also after the pulses are received by the stations from the transmitter during the intrinsic time T. If the elapsed time since the first PN signal has been received by one of the stations, exceeds the guard time Tg and some of the stations still do not receive the signals from the transmitter, it is judged that the PN signals which should reach the stations are missing or discarded. In the improved system, it is possible to automatically reset the delay detecting unit when such a judgment is made, so that the delay detecting unit is shifted to a next time period for which the guard time Tg is measured after the intrinsic time T.

Figure 11:
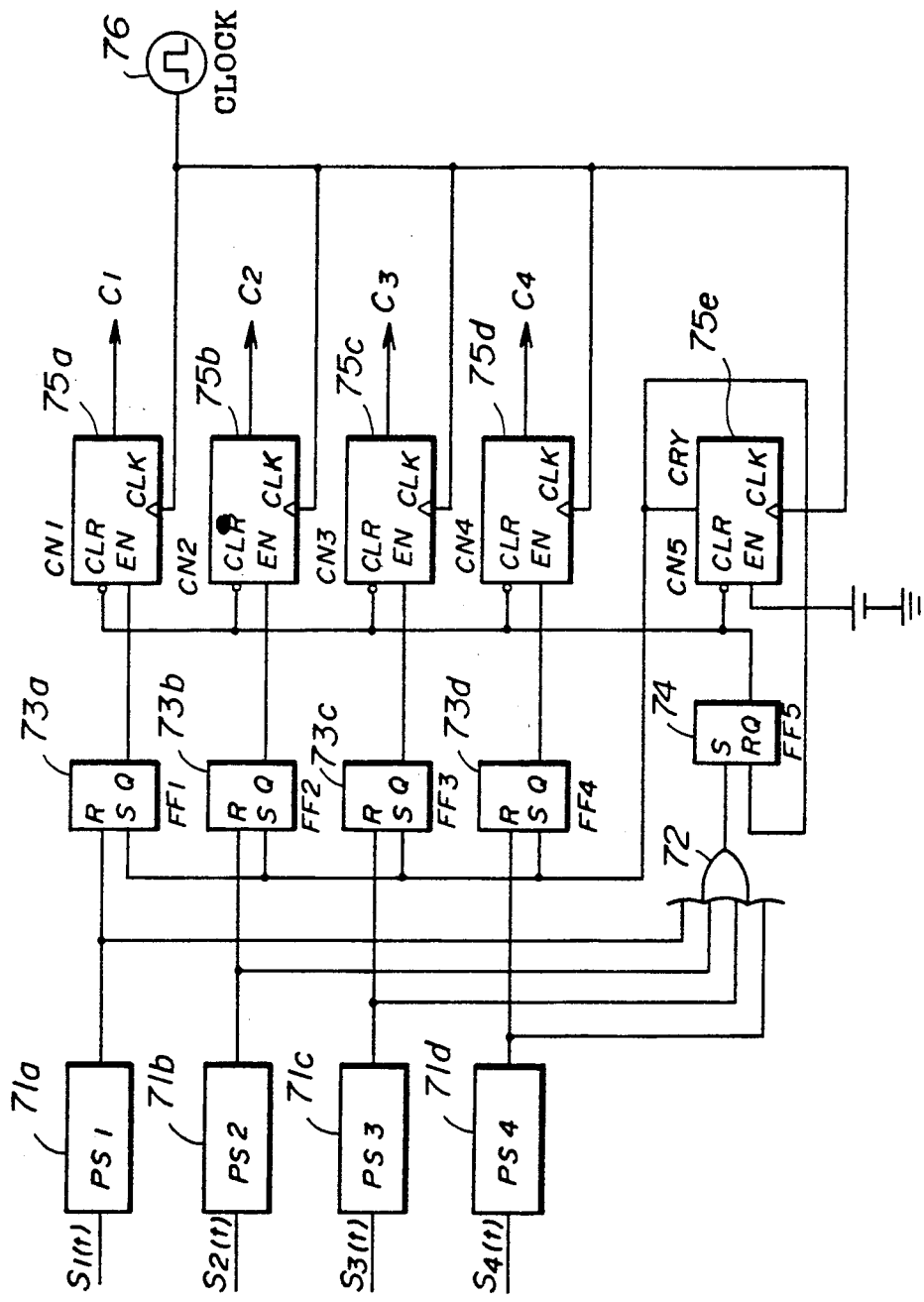
FIG. 11 is a circuit diagram showing a delay detecting unit in an improved position measuring system.

FIG. 11 shows the construction of a delay detecting unit in the improved position measuring system for achieving the above described function. In FIG. 11, this delay detecting unit includes a set of pulse shapers ("PS1" to "PS4") 71a to 71d, an OR circuit 72, a set of flip-flops ("FF1" to "FF4") 73a to 73d, a flip-flop ("FF5") 74, a set of counters ("CN1" to "CN5") 75a to 75e, and a clock pulse generator 76. The functions of the counters CN1 to CN4 and the flip-flops FF1 to FF4 of this delay detecting unit are the same as those of the corresponding parts of the delay detecting unit 4 shown in FIG. 4, except that the counter CN5 functions to measure the guard time Tg.

The output of the flip-flop FF5 is changed to high state by a first incoming pulse which is one of the correlative pulses Si(t) received by the pulse shapers PS1 to PS4, and immediately a counting of clock pulses supplied by the clock pulse generator 76 is started by each of the counters CN1 to CN4. When a count number of the clock pulses corresponding to the guard time Tg is counted up by the counter CN5, a carry indicating the count number appears in the counter CN5. When the output of the flip-flop FF5 is changed to low state, each of the counters CN1 to CN4 stops counting of the clock pulses immediately at that time so that the counts Ci (i=1 to 4) appearing at that time are output by the counters CN1 to CN4 to the computer 5 so that the time differences ti are calculated from the counts ti (i=1 to 4).

In the case where the PN signals are periodically and continuously transmitted by the transmitter having no trigger generator as shown in FIGS. 5 and 6, the setting of the trigger generator cannot be adjusted in such a manner that the pulses are periodically transmitted at intervals of the time period T1. Thus, it is necessary that the time period of the PN signals being transmitted by the transmitter is suitably selected in accordance with the environment in which the position measuring system is located. The time period T2 of the PN signals being transmitted by the transmitter of the improved position measuring system is modified in the manner that the time period T2 is greater than or equal to twice the guard time Tg (T2≧2Tg). This guard time Tg is predetermined according to the above equation (3). Suppose a case in which a sound wave is used as the carrier of the PN signals (the speed of sound: 300 m/s), the frequency of the PN signals being transmitted is set to 6 kHz, and the difference (Lmax−Lmin) between the maximum distance and the minimum distance is set to 20 m. In this case, the required frequency N of the PN signals being transmitted is represented as follows.

$$N \geq (20/300) \times 6000 = 400$$

Figure 12:
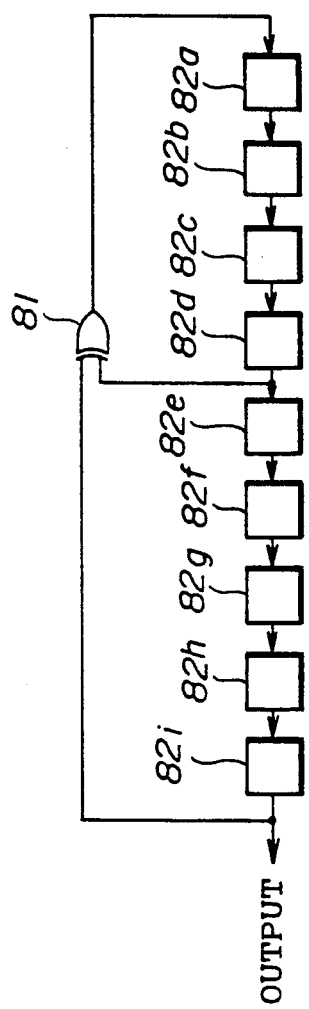
FIG. 12 is a diagram showing a pseudo-noise signal generator of a transmitter in an improved position measuring system.

FIG. 12 shows a PN generator for generating the PN signals periodically at intervals of the time period T2 that is greater than or equal to twice the guard time Tg, the PN generator using a feedback shift register. In FIG. 12, the PN generator includes an Exclusive-OR circuit 82 and a set of nine flip-flops 82a through 82i.

Figure 13:
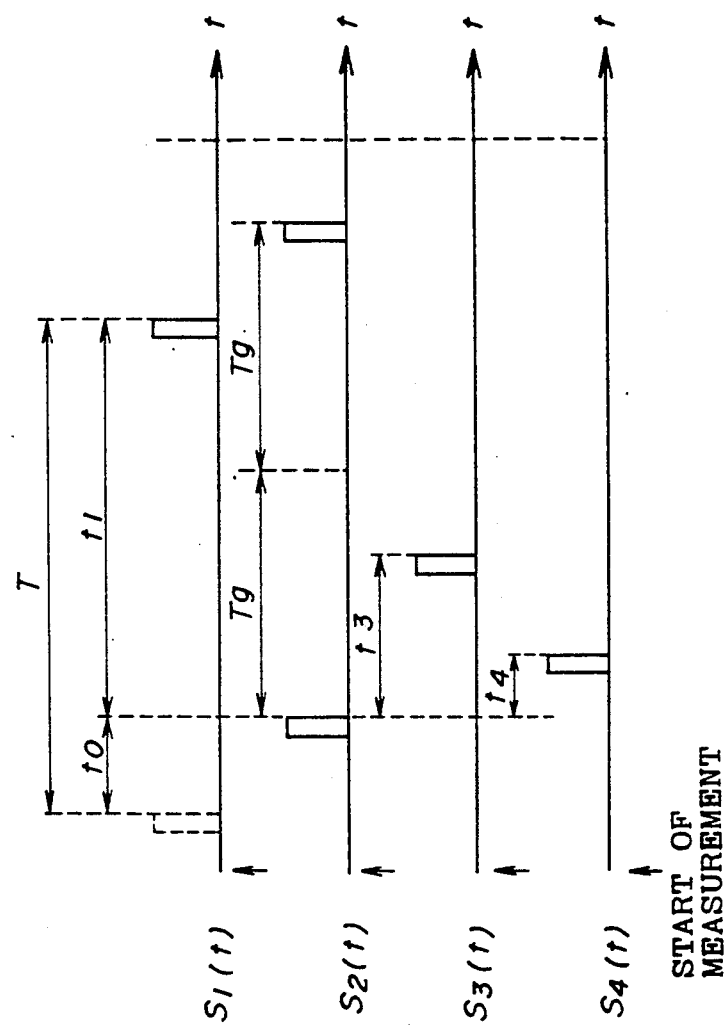
FIG. 13 is a time chart for explaining pulses supplied by the receivers of the stations to a delay detecting unit when one of the pulses is missing.

FIG. 13 shows the pulses which are received by the delay detecting unit of the improved position measuring system. In the transmitter on the moving object, the time period T2 of the PN signals being transmitted is selected as being greater than or equal to twice the guard time Tg. The pulses shown in FIG. 13 are those after the correlative pulses Si(t) received from the stations have been passed through the pulse shapers PS1 to PS4 in the delay detecting unit. In the case of the pulses shown in FIG. 13, a first pulse S1(t) which would be first received by the delay detecting unit from the nearest station 1a is missing due to the environmental condition, and this missing pulse is indicated by a dotted line in FIG. 13. A second pulse S2(t) which was actually received by the delay detecting unit from the station 1b second to the first pulse S1(t) is incorrectly detected as being the first one. In this case, incorrect time differences t1, t3 and t4 are measured by the delay detecting unit because the second pulse S2(t) is used as the reference time.

If the above described method of measuring the time differences is applied to this case, the measured time difference t1 for the station 1a is incorrectly the maximum as shown in FIG. 13, although the station 1a is located nearest to the moving station. In the case of FIG. 13, the greatest possible value of the time difference t0 between reception of the missing pulse S1(t) and reception of the pulse S2(t) (the reference time) is equal to Tg. The measured time difference t1 for the station 1a is greater than the guard time Tg, and therefore the maximum value of (t0+t1) is equal to twice the guard time Tg.

In order to eliminate the above problem, in the improved position measuring system, the time period T2 is selected as being greater than or equal to twice the guard time Tg, and each of the measured time differences ti is compared with the guard time Tg according to the present invention. If it is detected that the measured time difference ti is greater than the guard time Tg, the time period T2 is subtracted from the measured time difference ti and the resulting (ti−T2) is substituted for the time difference. If it is detected that the measured time difference ti is not greater than the guard time Tg, the above described subtraction is not performed and the calculation which is the same as previously described above is performed. Therefore, it is possible to calculate correctly the time differences from the received PN signals even when any of the PN signals is missing or discarded.

Figure 14:
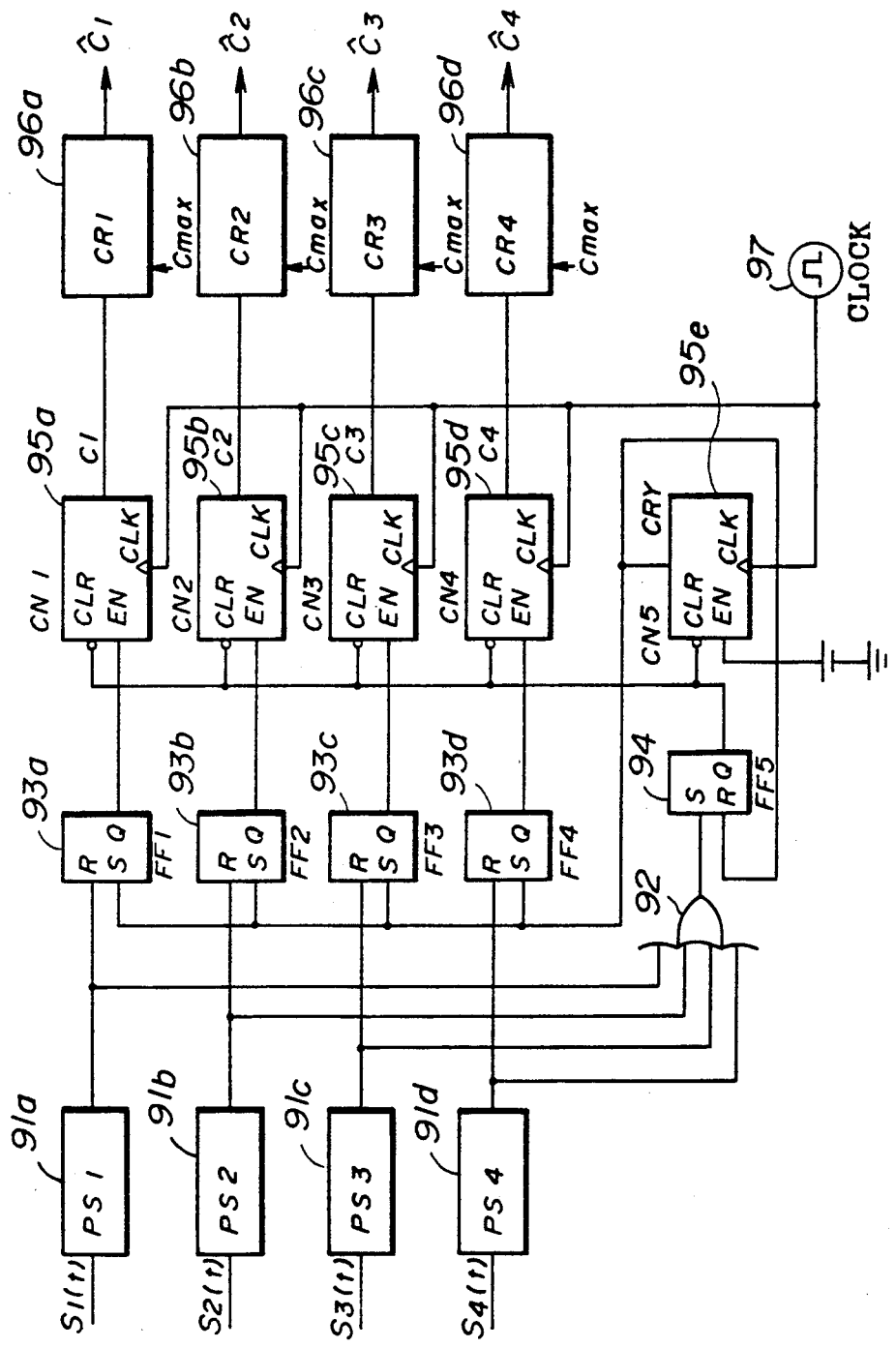
FIG. 14 is a circuit diagram showing a delay detecting unit including a plurality of count correcting parts.

FIG. 14 shows another delay detecting unit of an improved position measuring system, and this delay detecting unit has a capability of correcting the time differences calculated from the received PN signals. In FIG. 14, the delay detecting unit includes pulse shapers ("PS1" to "PS4") 91a to 91d, an OR circuit 92, flip-flops ("FF1" to "FF4") 93a to 93d, a flip-flop ("FF5") 94, counters ("CN1" to "CN4") 95a to 95e, count correcting parts ("CR1" to "CR4") 96a to 96d, and a clock pulse generator 97.

The functions of the counters CN1 to CN4 and the flip-flops FF1 to FF4 of this delay detecting unit are the same as those of the corresponding parts in FIG. 11, except that the counter CN5 functions to measure the time period T, and that the count correcting parts CR1 to CR4 correct the counts C1 to C4 indicating the time differences calculated from the received PN signals. In FIG. 14, the output of the flip-flop FF5 is changed to high state by a first incoming pulse which is one of the correlative pulses Si(t) received by the pulse shapers PS1 to PS4, and immediately a counting of clock pulses supplied by the clock pulse generator 97 is started by each of the counters CN1 to CN4. When a count number of the clock pulses corresponding to the time period T2 of the PN signals being transmitted by the transmitter is reached in the counter CN5, a carry indicating the count number appears. In other words, each time the time period T2 has elapsed, the counters CN1 to CN4 output the counts C1 to C4 to the count correcting parts CR1 to CR4, respectively, and they are immediately reset. In each of the count correcting parts CR1 to CR4, each of the received counts Ci (i=1 to 4) indicating the time differences ti with respect to the stations is compared with a maximum count Cmax. This maximum count Cmax, supplied to each of the count correcting parts, is preset to a count number of the clock pulses corresponding to the guard time Tg.

FIG. 15 is a flow chart for explaining a correction process in which the counts Ci indicating the time differences ti are corrected by the parts 96a to 96d of FIG. 14 before the counts Ci are output to the computer 5, if the missing of the PN signal occurs. In step S11 of the flow chart of FIG. 15, each of the counts Ci is received by the count correcting parts CRi from the counters CNi of the delay detecting unit shown in FIG. 14. In step S12, each of the counts Ci is compared with the maximum count Cmax indicating the number of the clock pulses corresponding to the guard time Tg. If it is detected in step S12 that the Ci is not greater than the Cmax, step S14 outputs the Ci to the computer 5 so that the coordinates of the detected position are calculated without changing the counts Ci. If it is detected that the Ci is greater than the Cmax, step S13 subtracts a count number Ct from the count Ci, and the resulting value of (Ci−Ct) is output to the computer 5 so that the coordinates of the detected position are correctly calculated by using the subtracted value (Ci−Ct). This count number Ct is preset to a count nubmer of clock pulses corresponding to the time period T2 of the PN signals being transmitted. If the correction process described above is applied to the case of FIG. 13, the Ct is preset to a count number that is equal to twice the above maximum count Cmax (Ct=2×Cmax).

Further, the present invention is not limited to the above described embodiments, and variations and modifications may be made without departing form the scope of the present invention.

What is claimed is:

1. A system for measuring a position of a first moving object in a limited area, said system comprising:
    a first transmitter provided on the first moving object for repeatedly transmitting a first pseudo-noise signal, transmission of said first signal repeated at a first time interval equal to a first period;
    a plurality of stations located at predetermined coordinates in the limited area, each of said stations including;
    receiving means for receiving said first signals from said transmitter,
    detection means for detecting when a first signal is received by said receiving means, generation means for generating a correlative pulse when a first signal is detected by said detecting means, wherein each station produces a correlative pulse when that station receives a first signal, means for transmitting the correlative pulses from each of the stations to a delay detection means;

said delay detection means for detecting time differences of less than said first period between reception of a first correlative pulse signal generated by a first station and a subsequent correlative pulses generated by each of the remaining stations; and control means for calculating coordinates of the position of said first moving object based on the detected time differences supplied by said delay detecting means and predetermined time delays associated with transmission of correlative pulses from each station to said delay detection means due to the predetermined coordinates of each of the stations in the area and the coordinates of the delay detection means.

2. A system according to claim 1, wherein said transmitter provided on said first moving object continuously periodically transmits the first pseudo-noise signal to the plurality of stations, said first period associated with said first moving object.

3. A system according to claim 1, wherein said transmitter includes a trigger generator for generating trigger signals to allow said transmitter to intermittently transmit the pseudo-noise signals to the plurality of stations at time intervals controlled by a period of said trigger signals supplied by said trigger generator, said given time intervals of transmitting said pseudo-noise signals being in accordance with an intrinsic period which is assigned to said first moving object.

4. A system according to claim 1, wherein said receiving means and said detection means provided in each of the stations are formed by a delay lock loop and a signal sequence detector, said delay lock loop performing a frequency tracking of the PN signals received from said transmitter on said moving object, and said signal sequence detector detecting a prescribed sequence of the pseudo-noise signals from signals supplied by said delay lock loop, so that a reception timing signal is output to said delay detecting means each time the prescribed sequence of the pseudo-noise signals is detected.

5. A system according to claim 1, wherein said transmitter is modified so as to transmit the pseudo-noise signals to the plurality of stations periodically and intermittently at time intervals determined by adding a guard time to said first period assigned to the first moving object, said guard time being represented based on a time required for said pseudo-noise signals to be propagated through a distance corresponding to a difference between a maximum distance from the first moving object to a furthest station among the stations in the area and a minimum distance from the moving object to a nearest station among the stations in the area.

6. A system according to claim 5, wherein each of the stations is capable of detecting whether or not a time corresponding to said guard time has elapsed since the first pulse signal is received by one of the stations from said transmitter when said transmitter periodically and intermittently transmits the pseudo-noise signals to the stations.

7. A system according to claim 1, wherein said transmitter is modified so as to transmit the pseudo-noise signals periodically at time intervals defined by a second period which is greater than twice a guard time, said guard time being represented based on a time required for said pseudo-noise signals to be propagated through a distance corresponding to a difference between a maximum distance from the moving object to a furthest station among the stations in the area and a minimum distance from the moving object to a nearest station among the stations in the area.

8. A system according to claim 1, wherein said delay detecting means is capable of detecting whether or not said time difference is greater than a guard time, said guard time being represented based on a time required for said pseudo-noise signals to be propagated through a distance corresponding to a difference between a maximum distance from the first moving object to a furthest station among the stations in the area and a minimum distance from the first moving object to a nearest station among the stations in the area.

9. A system according to claim 8, wherein said control means is capable of subtracting a time interval defined by said second period from said time difference supplied by said delay detecting means when it is detected that said time difference is greater than said guard time, so that coordinates of the position of the first moving object are calculated based on said subtracted time difference.

10. A system according to claim 2, wherein said transmitter is modified s as to transmit the pseudo-noise signals periodically at time intervals defined by a second period which is greater than twice a guard time, said guard time being represented based on a time required for said pseudo-noise signals to be propagated through a distance corresponding to a difference between a maximum distance from the moving object to a furthest station among the stations in the area and a minimum distance from the moving object to a nearest station among the stations in the area.

* * * * *

UNITED STATES PATENT AND TRADEMARK OFFICE
CERTIFICATE OF CORRECTION

PATENT NO. : 5,216,429

DATED : June 1, 1993

INVENTOR(S) : Yoshikatsu Nakagawa et al.

It is certified that error appears in the above-identified patent and that said Letters Patent is hereby corrected as shown below:

On the title page, Item [30],

The second Foreign Application Priority Data is incorrect, should read:

--Jun. 27, 1991 [JP] Japan..............3-182972--

Signed and Sealed this

Twenty-first Day of December, 1993

Attest:

BRUCE LEHMAN

*Attesting Officer*   *Commissioner of Patents and Trademarks*